United States Patent
Turjancik

(10) Patent No.: US 9,522,650 B1
(45) Date of Patent: Dec. 20, 2016

(54) MICRO MOTION WARNING DEVICE WITH NONE FALSE ALARM SYSTEMS

(71) Applicant: Vasil W. Turjancik, Clifton, NJ (US)

(72) Inventor: Vasil W. Turjancik, Clifton, NJ (US)

(73) Assignee: Vasil W. Turjancik, Clifton, NJ (US)

( * ) Notice: Subject to any disclaimer, the term of this patent is extended or adjusted under 35 U.S.C. 154(b) by 0 days.

(21) Appl. No.: 14/120,916

(22) Filed: Jul. 10, 2014

(51) Int. Cl.
*B60R 25/10* (2013.01)
*B60Q 1/00* (2006.01)
*B60Q 11/00* (2006.01)
*B60R 25/20* (2013.01)
*H01H 35/14* (2006.01)
*B60R 25/104* (2013.01)

(52) U.S. Cl.
CPC ............ *B60R 25/20* (2013.01); *B60R 25/104* (2013.01); *B60R 25/1004* (2013.01); *H01H 35/144* (2013.01)

(58) Field of Classification Search
CPC .. G08B 13/1436; H01H 35/14; H01H 1/5833; H01H 2011/062; H01H 35/02
See application file for complete search history.

(56) References Cited

U.S. PATENT DOCUMENTS

| 3,733,448 A * | 5/1973 | Brady | 200/61.45 R |
| 3,745,551 A * | 7/1973 | Smith | G08B 13/08 340/546 |
| 4,030,087 A * | 6/1977 | Ritchie | G08B 13/1436 307/117 |
| 4,322,714 A * | 3/1982 | Morgan | 340/427 |
| 4,479,114 A * | 10/1984 | Yamamoto | G08B 13/02 200/61.49 |
| 4,675,593 A * | 6/1987 | Minakuchi | G05F 3/265 323/314 |
| 4,771,193 A * | 9/1988 | Ohta | G01R 13/32 315/367 |
| 4,772,879 A * | 9/1988 | Hein | B60R 25/1007 340/429 |
| 4,794,368 A * | 12/1988 | Grossheim et al. | 340/426.25 |
| 4,980,667 A * | 12/1990 | Ames | 340/427 |

(Continued)

*Primary Examiner* — Steven Lim
*Assistant Examiner* — Muhammad Adnan

(57) ABSTRACT

A device capable of detecting motion, specifically extremely small amounts of motion (micro motion), this device also provides real driving safety and protection from carjacking and theft. it also offers protection from accidents and false alarms. it triggers high power LEDS and a chirping sound during an occasional driver's mistake to warn nearby drivers and pedestrians that a vehicle is fast approaching and/or turning and hard braking, everyone knows that real safety can be achieved only if everybody around is aware of the dangerous situation, it navigates drivers to develop diligent driving habits by detecting risky vehicle operation, in which case it shuts down only the safety driving protection temporarily until safe driving is restored, this device rewards safe drivers by protecting them. If the vehicle is carjacked or has been stolen then the system triggers an alarm and a sign call 911 during unauthorized driving, but if the vehicle stops then the alarm stops, if the vehicle starts moving again the alarm starts again. when the vehicle is parked and a intruder tries to enter the vehicle the system triggers a warning no one can ignore. all of the above in one device the new micro motion warning device with false alarm prevention system.

3 Claims, 3 Drawing Sheets

(56) References Cited

U.S. PATENT DOCUMENTS

| | | | | |
|---|---|---|---|---|
| 5,027,105 | A | * | 6/1991 | Dailey ............... G08B 13/1436 |
| | | | | 200/61.45 R |
| 5,278,553 | A | * | 1/1994 | Cornett ............... G08G 1/0965 |
| | | | | 340/902 |
| 5,319,350 | A | * | 6/1994 | DeMarco ........... B60R 25/1004 |
| | | | | 340/426.22 |
| 5,321,390 | A | * | 6/1994 | Yuen ................. G08B 13/1436 |
| | | | | 340/566 |
| 5,430,432 | A | * | 7/1995 | Camhi et al. ................. 340/438 |
| 5,625,337 | A | * | 4/1997 | Medawar ................. B60Q 1/52 |
| | | | | 307/10.6 |
| 5,698,827 | A | * | 12/1997 | Turjancik ............... 200/61.45 R |
| 5,774,002 | A | * | 6/1998 | Guo ....................... H04L 7/027 |
| | | | | 327/113 |
| 5,963,131 | A | * | 10/1999 | D'Angelo et al. ......... 340/568.1 |
| 6,198,059 | B1 | * | 3/2001 | Jou ............................ 200/61.52 |
| 6,456,194 | B1 | * | 9/2002 | Carlson ............. B60G 17/0165 |
| | | | | 340/440 |
| 7,256,360 | B1 | * | 8/2007 | Chou et al. ............ 200/61.45 R |
| 7,342,373 | B2 | * | 3/2008 | Newman ........... B60H 1/00735 |
| | | | | 318/280 |
| 2007/0012552 | A1 | * | 1/2007 | Chou .................... 200/61.45 R |
| 2008/0030316 | A1 | * | 2/2008 | Flick ............................. 340/466 |
| 2010/0033329 | A1 | * | 2/2010 | Davis et al. ................. 340/571 |
| 2010/0133075 | A1 | * | 6/2010 | Chou ......................... 200/61.52 |
| 2011/0292554 | A1 | * | 12/2011 | Yao ........................... H03F 1/52 |
| | | | | 361/56 |
| 2012/0105635 | A1 | * | 5/2012 | Erhardt ................. B60R 25/102 |
| | | | | 348/148 |

* cited by examiner

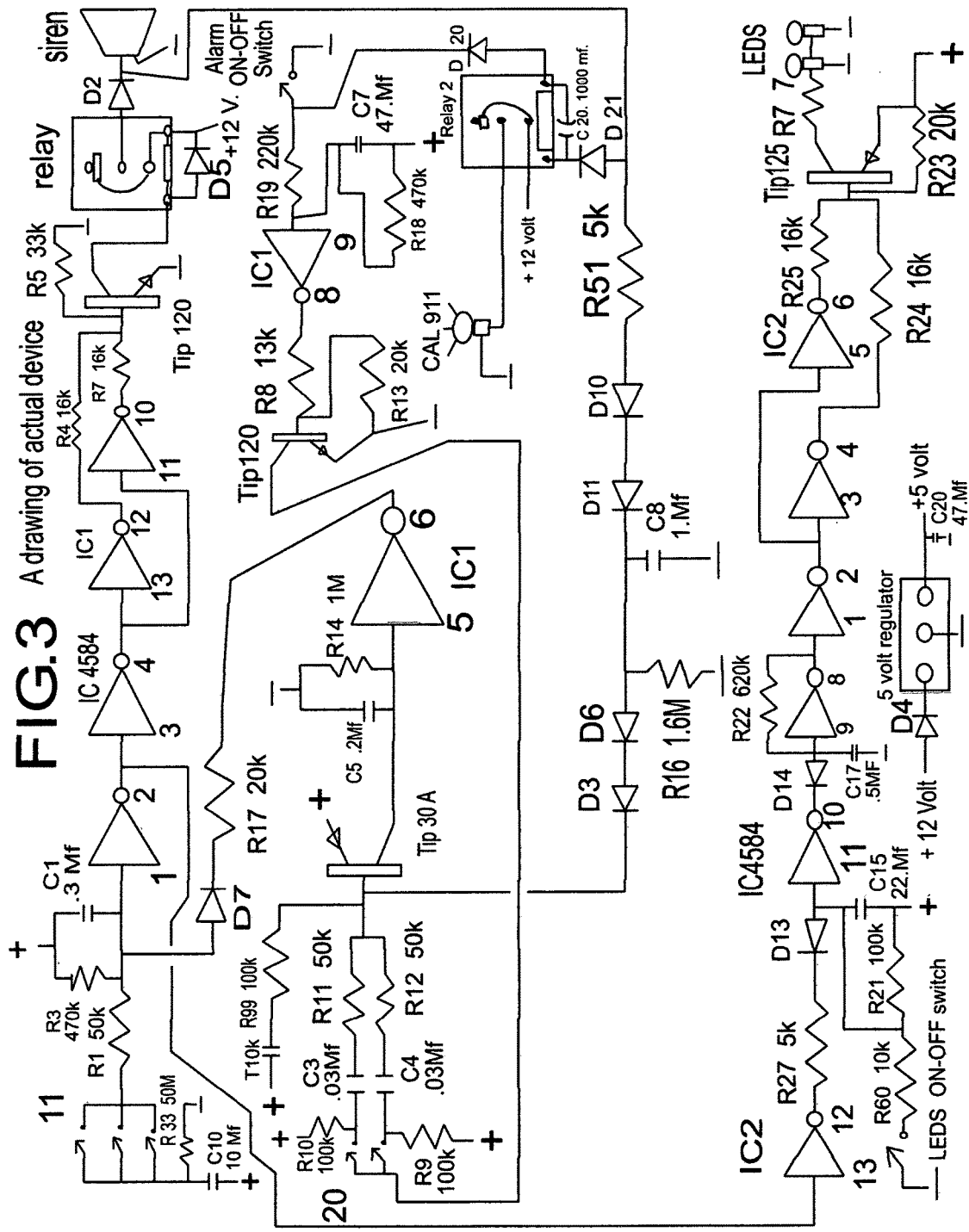
FIG.3  A drawing of actual device

MICRO MOTION WARNING DEVICE WITH NONE FALSE ALARM SYSTEMS

FIELD OF THE INVENTION

The present invention is in the field of devices capable of detecting motion specifically small amounts of motion which are referred to herein as micro motion. Such devices are typically provided with an electrical/electronic portion which is capable of detecting motion and translating it into an audible and/or visible signal to the user of the device or nearby drivers and pedestrians. It is common for such devices to utilize as the motion sensor an electronically conductive ball that vibrates in response to such motion, in the course of which it makes and brakes electrical contact with various terminals along the way. Such devices are frequently incorporated into anti-carjacking and related security devices for automobiles and other possessions, as a critical part thereof.

A new micro motion sensor has high sensitivity and high reliability, and the false alarm prevention system can eliminate false alarms.

BACKGROUND OF THE INVENTION

This invention stops and eliminates false alarms but, micro motion sensitivity remains high. It can prevent accidents, carjacking and theft. It also offers an early warning system and safer and more secure driving. It triggers high power LEDS and a chirping sound during an an occasional driver's mistake to warn nearby drivers and pedestrians that a vehicle is fast approaching and/or turning and braking.

Everyone knows that real safety can be achieved only if everybody around is aware of the dangerous situation. It navigates drivers to develop good driving habits, if it detects risky vehicle operation then it shuts down only the safe driving protection temporarily until safe driving is restored. If the vehicle is carjacked or has been stolen then the system triggers an alarm and sign Call 911 during unauthorized driving. When the intruder tries to enter the parked vehicle the false alarm triggers a chirp and power LEDS emitting diodes as long as intruder keeps trying, when the intruder stops trying then the alarm also stops.

FIG. 2 No. 19 is an ON-OFF manually operated alarm switch it can be installed in secret location. If the alarm switch is ON it provides early warning, anti-carjacking and false alarm prevention system.

The alarm OFF is for normal driving and for safe driving protection.

BRIEF DESCRIPTION OF THE PRIOR ART

Vehicle safety devices have a number of disadvantages. for example: anti-lock brake system activates during hard braking and turning and because the vehicle will not lose traction, it will turn and not slide. After a short turn the vehicle has to be turned back to the original direction in order proceed safely. however, if turning continues too far or turning is too quick, the vehicle can turn over and crash because the anti-lock brake system is in action. on snow covered roads it is better to drive without the anti-lock brake system because locked wheels would build up the snow in front of tires and help to shorten braking distance. a skilled driver can get through safely without anti-lock brake system by using his/her judgment as to whether to employ tire slip or turning and braking with alert. also, vehicle security is not perfect—there is a long standing problem of annoying false alarms. Scientists are split in half whether the anti-lock brake system is helpful or harmful to a vehicle. A micro motion sensor has been invented and improved of previously issued patent see below U.S. Pat. No. 5,698,827 the best theft protection can be achieved with an early warning system. This early warning system fell short because it caused false alarms during windy condition and very loud sounds at close range. Therefore, new micro motion early warning device had to be created to eliminate or stop false alarms listed above.

Further aspects and uses, as well as additional advantages of the present invention will become apparent to those of ordinary skill in the detailed description of the present invention.

BRIEF DESCRIPTION OF THE DRAWINGS

FIG. 3 is a completed drawing of existing and well working device.

SUMMARY OF THE INVENTION

In accordance with the present invention there is provided a new micro sensing warning device with a system to stop false alarms comprising: contain 4 portions (a) a sensing portion (b) a detecting portion (c) a warning portion and (d) a false alarms prevention system portion. (A) The micro motion sensing portion of the device comprises the following: tilt sensor switches are used as a vibration sensors for the micro motion sensing portion of the device, a source of 5 volts. U.S. Pat. No. 6,198,059B1. the housing material: poliamide+glass-fiber. the cover material: poliamide+glass fiber. terminal: copper alloy, gold plated over nickel. ball material: alloy plated over nickel. Certificate: ROHS compliance.

(B) The detecting portion of the device for determining the presence of motion comprises the following components: the PNP transistor TIP 30A a source of direct current electromotive force of 5 volts.

(C) The warning portion of the device for alerting a user of the device, another person, or both, that a motion has been detected, comprises the following components: means for translating electrical current from the detecting portion into a siren and LEDS which is useful information to the user, another person, or both.

(D) In accordance with the present invention there is further provided a false alarm prevention system portion, wherein the device is upgraded by a very sensitive motion sensor.

for example:

if the car alarm is triggered by thunder or by a loud vehicle passing by at close range then the car alarm will chirp once and stop because the false alarm prevention system is in action. One chirp will bother no one!

DETAILED DESCRIPTION OF THE INVENTION

The device of the present invention provides total safety and security protection for the vehicle, driver and passengers.

Figure 1:
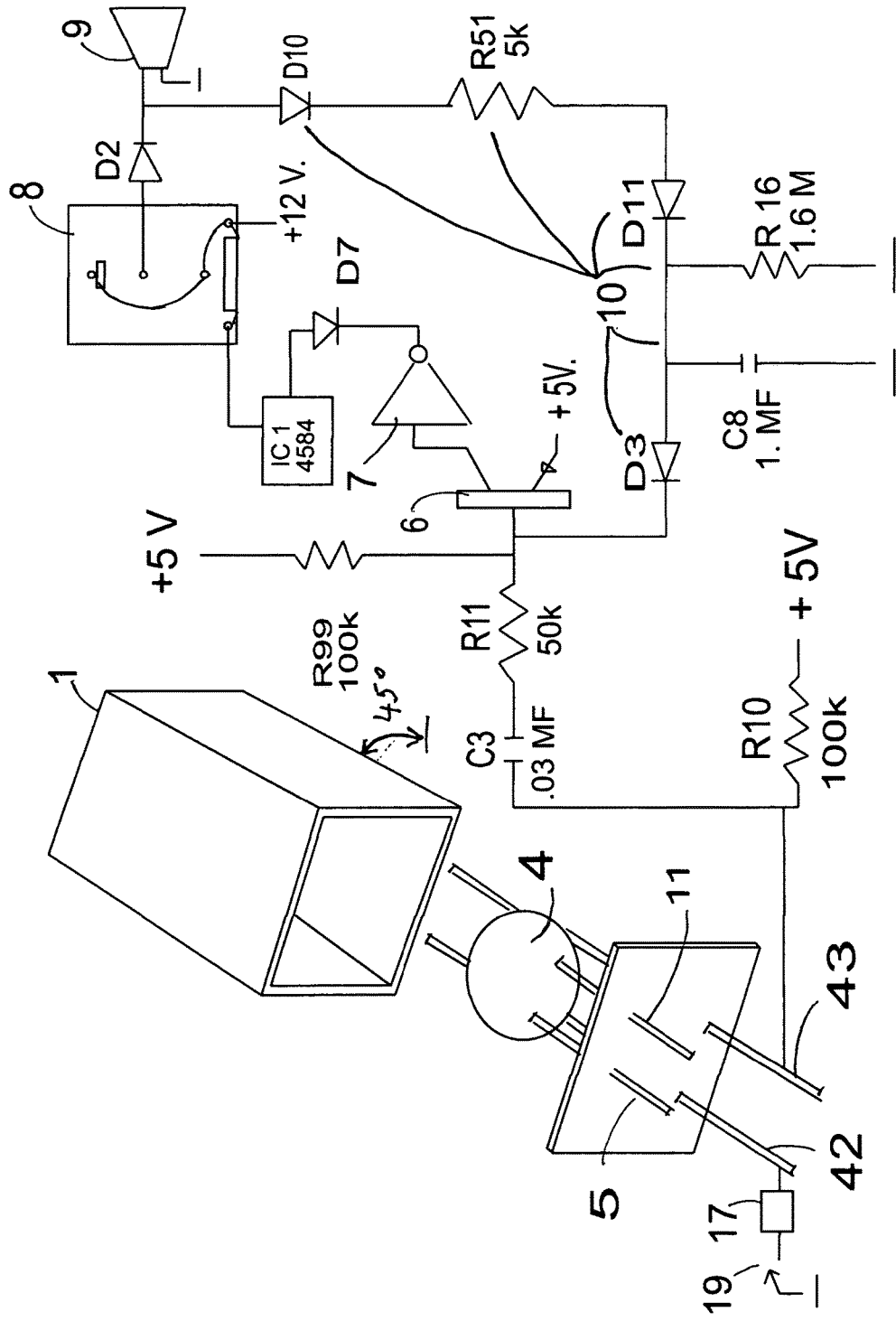
FIG. 1 (1) Shows new improved micro motion sensor in position which is well suited to eliminate false alarms, and also shows the false alarm prevention systems in detail.

For convenience of description and recitation, the device, of the present invention has been divided into four innovations: No. 1, vehicle safe driving protection No. 2 vehicle theft protection innovation, No. 3 Vehicle anti-carjacking protection innovation No. 4 vehicle false alarm prevention system innovation. Drawings FIG. 1 and FIG. 2 are incorporated into all electronic components into one device the new motion warning device with false alarm prevention system.

Figure 2:
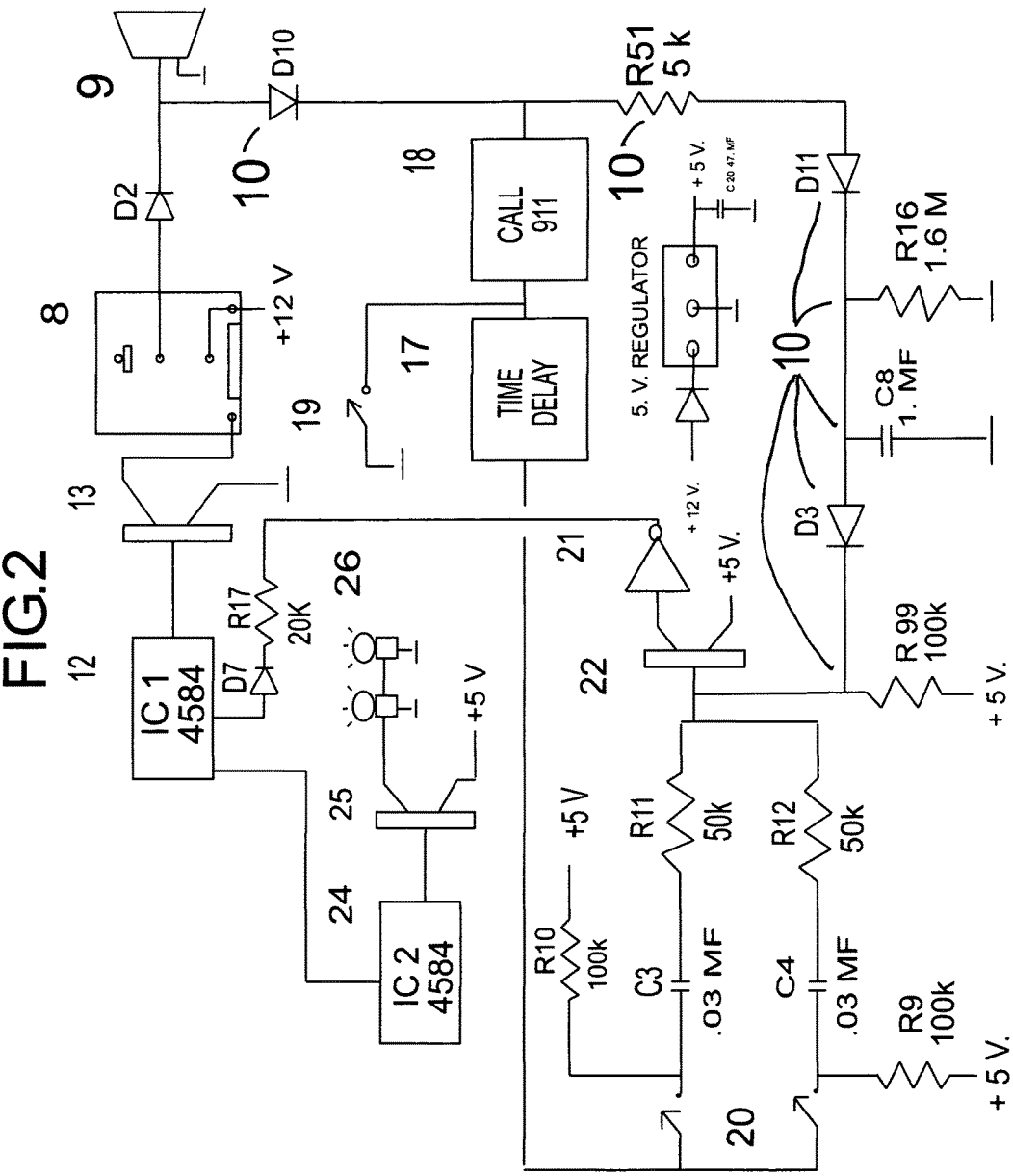
FIG. 2 is a block diagram of preferred detection circuitry for use in the devices of the present invention.

No 1 Vehicle safe driving protection. How it works:

See FIG. 2 if the driver makes a mistake during driving he/she probably will brake hard, accelerating or turning at high speed, therefore a tilt sensor No. 11 will make contact and using the energy of capacitor C10 to transfer the alarm signal to IC 1 and IC 2

The IC 1 will amplified and carry on that signal through No 13 and No 8 will trigger the siren. The IC 2 will also amplify that signal and carry on to No 25 to trigger high power LED's No 26.

For example: if the driver makes a mistake 2 times in 15 minutes then the capacitor C 10 will use all the electrical energy needed to trigger the alarm therefore, the vehicle safe driving protection will be shut down. however, if the driver for next 20 minutes does not make any mistakes during driving then the resistor R 33 will recharge the capacitor C10 and the vehicle safe driving protection will be restored.

This system rewards only safe drivers by protecting them.

No one is a perfect driver. This system can convert ordinary drivers to a safe drivers.

FIG. 2 No. 11 are 3 tilt sensors used as acceleration-deceleration sensors at normally open contacts at resting point of 22 degrees or as high as 30 degrees in regard to horizontal position, manufacturing by Onc Que Co Hong Kong U.S. Pat. No. 7,256,360 B purchased at Mouser Electronic.

No. 2) vehicle theft protection innovation.

If On-Off alarm switch FIG. 2 No 19 has been turn to the On position then 12 seconds later the brief chirp and the brief high power flash will follow to notify the driver that the system is ready to protect the vehicle from thieves, carjackers and hijackers, as well as protect the vehicle from false alarms.

How the vehicle theft protection works:

FIG. 1 No. 1 shows the housing of tilt sensor switch U.S. Pat. No. 6,198,05 B1 which is used as micro motion sensor in new micro motion device with false alarm prevention system. This tilt sensors at resting point of 45 degrees in regard to horizontal position has two rods No. 5 and No. 11 which are supporting the ball No 4 at the center of the ball so, they are taking the most of the gravitation pull of the ball. Therefore electrically connected conductors No. 42 and No. 43 are taking much less of the gravitational pull. This condition allows the ball to vibrate easily during external forces or during unauthorized driving therefore, a tilt sensor's sensitivity is high enough to trigger the alarm when the vehicle is moving. When the vehicle stops the alarm stops and the power LEDS stops flashing.

How all of that works:

see FIG. 1 No. 4 if the ball No. 4 starts vibrating then one of the conductors No. 42 or No. 43 changes the resistance from −0 to as high as 1. Million ohms When this happens then the resistor R10 will discharge the capacitor C3, and after that the conductor No. 42 or No. 43 will change the resistance back to −0. When this happens then the −0 resistance will recharge the capacitor C3, but before recharging the C3, the small part of −0 volt will pass through the capacitor C3 and that signal triggers the transistor No. 6.

again if the external forces are present. What happens next see FIG. 2 No. 22, when No. 22 is triggered then the signal will be amplified and travel along the way through No. 21, IC 1 No. 13 and relay No. 8 will trigger siren No. 9 and the same signal will go through the D10 to lighting up the sign Call 911 the same time IC 1 is sending another signal through IC 2 than No. 25 will trigger high power flashing LEDS.

No. 3 Vehicle anti-carjacking protection innovation, see FIG. 1

The anti-carjacking protection can be achieved with the manually operated On-Off alarm switch and with easy access to it by the driver. No. 4 vehicle false alarm prevention system innovation.

A vehicle false alarm prevention system comprised of D10, R51, D11, R16, C8, D3, R99, and transistor Tip 30 A No. 22. How it works:

If the alarm switch is On and siren No. 9 is triggered then the same power of 12 volt Dc is also going through D10, R51, D11 to a capacitor C8. when this happens the +12 volt starts charging the capacitor C8. It takes about a half second of charging time to elevate the voltage to about +7 volts. When this happens the +7 volts passes the D3 into a base of the transistor No. 22. When this happens it blocks the sensor's signal from entering the transistor base therefore it shuts down the transistor. However, this happens the alarm will stop. When the alarm stops the R16 will lower the voltage of C8 back to +5 volts and that takes about half a second therefore, after half a second the transistor will be restored and ready to trigger the alarm again if the external forces are present.

If the external forces are continuing then the alarm goes on for half a second and then off for half a second and on for half a second until external forces stop, then alarm will stop.

What is claimed is:

1. A micro-motion warning device for a vehicle comprising:
   a sensing portion comprising a housing which includes a tilt sensing ball which has a normal resting state at 22° with respect to horizontal axis, metal tilt switch contacts having contact resistance very close to zero and which remain open during normal operation, and a cover,
   wherein the housing and cover are made of polyamide and glass fiber, the ball is made of alloy plated over nickel and wherein the material used are ROHS (Restriction of Use of Hazardous Substances) compliant;
   a detection portion comprising a PNP transistor, a direct current source;
   a warning portion to alert people in vicinity and to call 911;
   false alarm preventing portion at least comprising a resistor, a diode, and a capacitor;
   a manually operated switch which controls operation of the false alarm preventing portion;
   the sensing portion, the detection portion, the warning portion and the false alarm preventing portion are in electrical communication with each other,
   wherein upon sensing external forces, caused by carjacking or occasional driving mistakes, by the sensing portion, an electrical signal is passed to a capacitor, then to the detection portion which detects and amplifies the electrical signal and finally passed to the warning device,
   upon receiving the electrical signal, an alarm can be generated by the warning portion, wherein if the manually operated switch is turned ON, the false alarm preventing portion takes over after a predetermined time of half a second, after the generation of the alarm, and shuts off the alarm, wherein if the external forces exist a predetermined time after the shut off, the alarm starts over again, the process is repeated until the external forces are stopped or the vehicle stops moving.

2. The micro-motion warning device according to claim 1, wherein the generated alarm comprises outputting high power lights from LEDs and chirping sounds during carjacking and/or occasional driving mistakes to warn/alert people in vicinity.

3. The micro-motion warning device according to claim 1, the tilt sensing ball has a normal resting state 45° with respect to the horizontal axis to reduce false alarms.

* * * * *